April 1, 1958 R. C. TALBOT 2,828,850
PACKAGE HANDLING METHOD AND APPARATUS
Filed Sept. 23, 1953 3 Sheets-Sheet 2

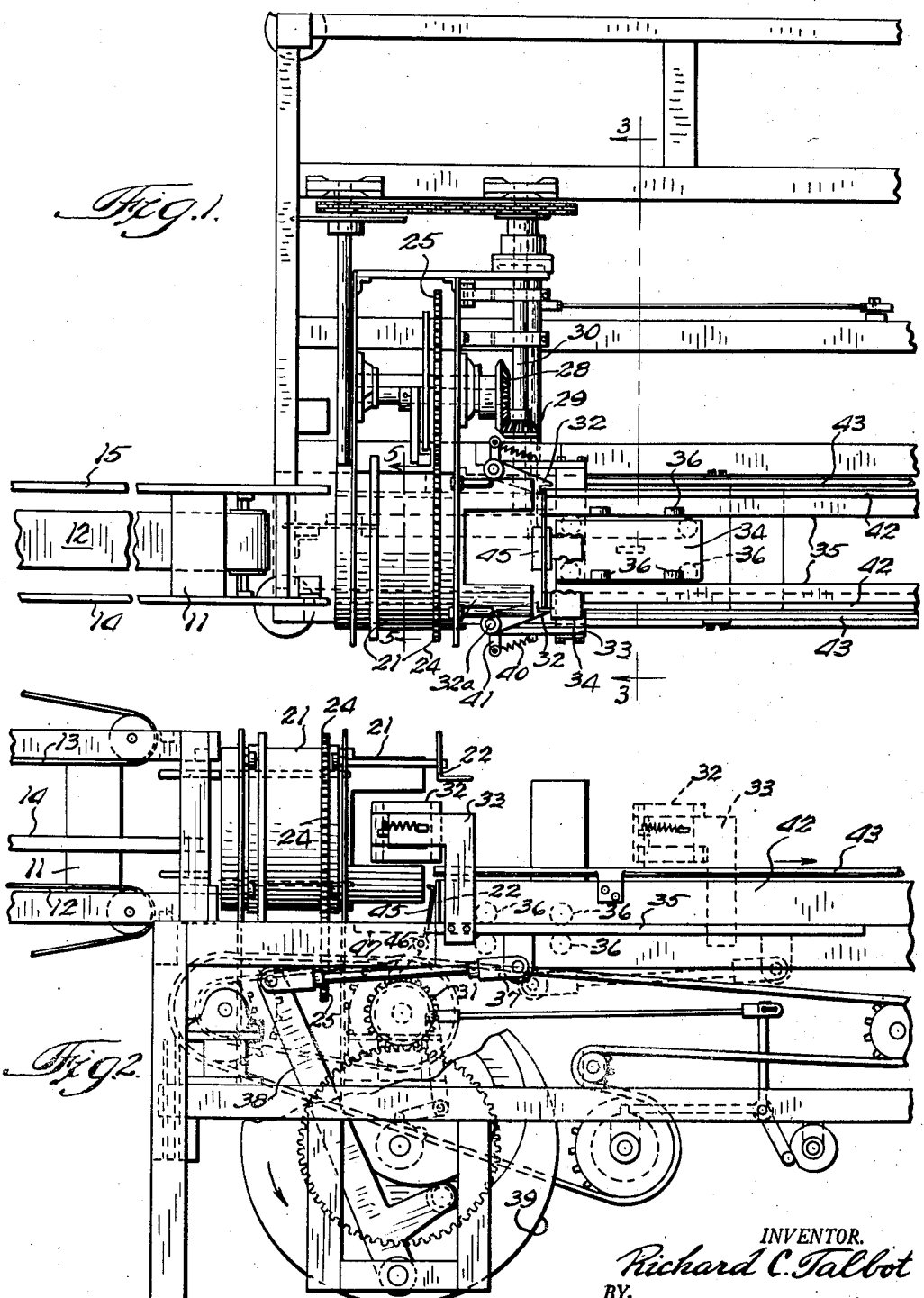

INVENTOR.
Richard C. Talbot.
BY
Thiess, Olson, Mecklenburger,
von Holst, & Coltman Attys.

United States Patent Office 2,828,850
Patented Apr. 1, 1958

2,828,850

PACKAGE HANDLING METHOD AND APPARATUS

Richard C. Talbot, Joliet, Ill., assignor to J. L. Ferguson Company, Joliet, Ill., a corporation of Illinois Application September 23, 1953, Serial No. 381,888

15 Claims. (Cl. 198—33)

This invention relates to a method and apparatus for handling packages, and it is an object of the invention to provide an improved method and apparatus of that character.

In the packaging industry a major problem concerns the manipulation of packages arranged in a single file to arrange them in a desired configuration of rows and files and tiers in condition to be inserted into a case. This invention is particularly adapted to such arrangement or rearrangement of packages but is not limited to this specific purpose.

Conventionally, a predetermined number of packages is successively removed from a supply file of packages, usually an advancing file, the successive groups thus removed either being inserted into a case in a single row abreast or being combined with successive groups to form a plurality of rows and files, following which the larger group is thrust into a case. This general method requires the movement of the predetermined number of packages laterally from the supply file in order that each successive group may be physically separated from the remainder of the supply file. If this lateral movement is substantially horizontal the machine necessarily requires substantial floor space because of the necessary machine width. If the lateral displacement is vertical, complications arise in the handling of the packages.

According to the present invention, the groups of packages of predetermined number are separated from a moving supply file by advancing the group of packages ahead of the supply file but in line therewith. The method and apparatus for separating the successive groups of packages from the supply file in order that this group may be advanced ahead of the remainder of the moving file, constitute features of the present invention.

According to one embodiment of the invention, the successive groups of packages of predetermined number are separated from the supply file of packages by apparatus which causes the rotation of successive groups of packages through an angle, preferably of 90°, about an axis parallel to the supply file. Commonly, the packages being handled are taller than they are wide, in directions perpendicular to the length of the supply file and to the direction of movement thereof. Such rotation of a group of packages through an angle of 90° causes the ends of the rotated packages to protrude beyond the sides of the nonrotated packages. These protruding ends may readily be engaged by fingers such that the rotated packages may be advanced ahead of the remainder of the supply file as an independent group. In the event that the packages present a square face, they may be rotated through an angle on the order of 45°, whereupon the corners of the rotated packages protrude beyond the sides of the nonrotated packages. These protruding corners may then be engaged and the rotated packages advanced ahead of the supply file to form an independent group.

Accordingly, it is another object of the invention to provide improved apparatus for separating a predetermined number of packages from a supply file of packages by advancing said predetermined number of packages in line with but ahead of the supply file. It is another object of the invention to provide an improved method for accomplishing the same purpose.

It is another object of the invention to provide improved apparatus for rotating a predetermined number of packages in a supply file and removing said packages from said supply file by engaging portions of said rotated packages which protrude beyond the edges of the packages remaining in the supply file. It is another object of the invention to provide an improved method for accomplishing the same purpose.

Conventionally, a predetermined number of packages in a supply file is removed from that supply file by apparatus which operates on a group of packages of predetermined length, measured along the length of the supply file. Even though the thickness of the packages may vary appreciably, such apparatus is accurate provided that a relatively small number of packages is to be included in each successive group. However, if a large number of packages is to be removed to form a single group, the variation in thickness of the packages may result in inaccuracy. For example, if 18 packages are required in each successive group, and if the packages vary in thickness by as much as 5%, it will be apparent that the length of supply file which would normally encompass 18 packages might in fact encompass 19 or only 17 packages. Since the apparatus operates only on a given length of supply file, the various groups of packages removed may include 17, 18 or 19 packages, depending upon the thickness of the packages. According to one embodiment of the present invention, the apparatus operates only on a predetermined length of the supply file as is conventional, but operates, nevertheless, in such a way as to assure the inclusion of the exact desired predetermined number of packages in each successive group removed from the supply file.

Accordingly, it is another object of the invention to provide improved apparatus for removing a predetermined number of packages from a supply file, said apparatus operating on a predetermined length of supply file but nevertheless accurately controlling the number of packages in the successive groups, regardless of the number of packages desired in such groups. It is another object of the invention to provide an improved method for accomplishing the same purpose.

This invention, together with further objects and advantages thereof, will best be understood by reference to the following description taken in connection with the accompanying drawings, and its scope will be pointed out in the appended claims.

In the drawings, in which like parts are designated by like reference numerals,

Fig. 1 is a plan view of a machine constructed in accordance with one embodiment of the invention;

Fig. 2 is an elevational view of the same machine;

Figure 3:
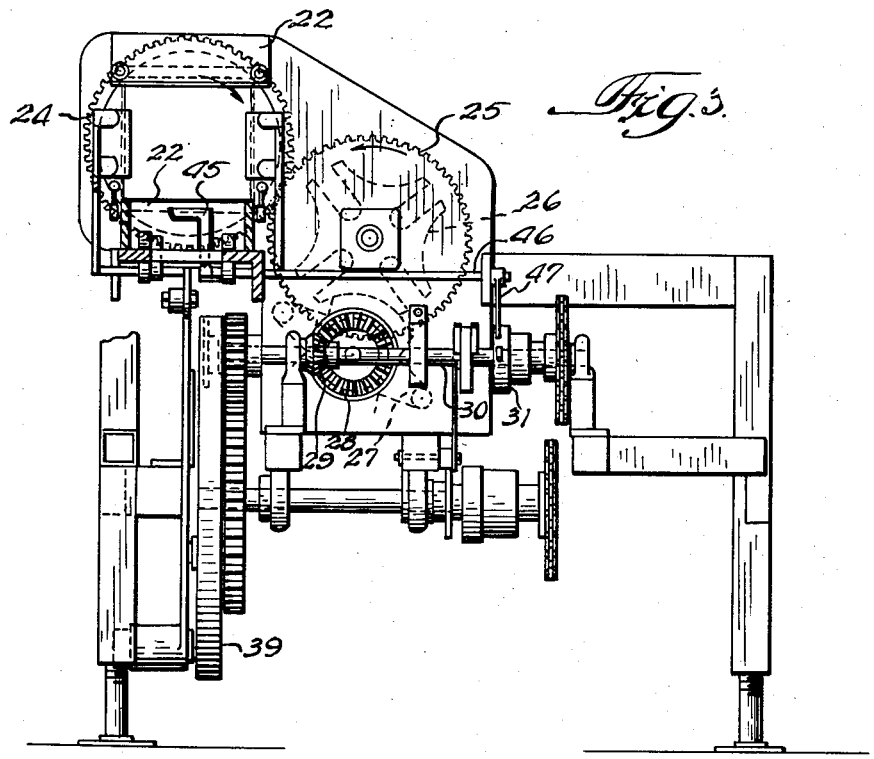
Fig. 3 is a cross-sectional view of the same machine taken along the line 3—3 of Fig. 1.

The invention as illustrated in the drawings is embodied in a machine which operates on a single file of packages and ultimately inserts such packages into cases, the packages being arranged in the cases in two files each containing 9 packages. Most of the working parts of the machine, however, are not directly associated with the present invention and accordingly are not disclosed in the drawings or described herein.

At the left in Figs. 1 and 2 may be seen conveyor means for advancing a single file of packages 11 to the right. The conveyor means comprises a pair of belts 12 and 13 and a pair of guide rails 14 and 15. It will be readily seen that the belt 12 engages the bottom ends of the packages 11 and supports the packages, and that the belt 13 engages the upper ends of the packages. While a single package 11 is illustrated in Figs. 1 and 2, it will be understood that the conveyor means preferably advances a supply file of packages in close formation.

Figure 5:
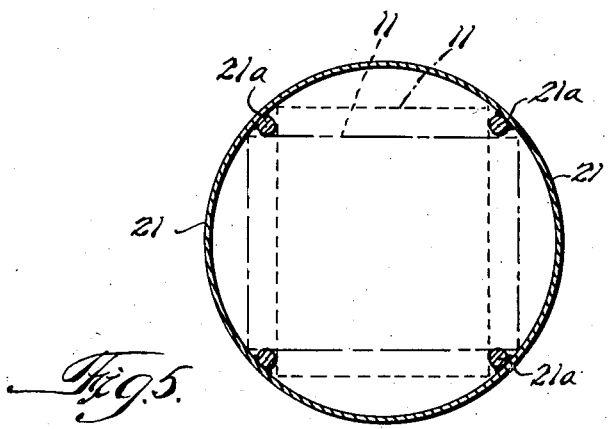
Fig. 5 is an enlarged end view of a package rotating drum included in the machine of Figs. 1–3.

As the successive packages 11 leave the conveyor belts 12 and 13 they advance into a rotatable drum 21 which has tracks to guide the packages therethrough. As may best be seen in Fig. 5, rods 21a, in cooperation with the inner surface of the drum 21 to which the rods are suitably secured, form tracks for receiving freely four edges of the packages.

When the packages 11 leave the conveyor belts 12 and 13 they are forced into and through the cylinder 21 by the pressure of succeeding packages which are being frictionally advanced by the conveyor belts. This movement continues until the lead package engages a pair of stop members 22, arranged closely adjacent the exit end of the cylinder 21. The stop members 22 are described in greater detail below, it being sufficient for the present to understand that they are fixedly mounted and are so located as to engage and halt the advancement of the entire supply file, or at least that portion thereof which is in close file. It will be understood that under these circumstances the conveyor belts 12 and 13 slip over the engaged ends of the packages 11 which are still in contact therewith.

The cylinder 21 is supported by suitable bearings which are not disclosed in detail in the drawings. Secured to the periphery of the drum 21 is a ring gear 24 adapted to engage another gear 25, best seen in Fig. 3. The latter is arranged on a common shaft with the driven member 26 of a conventional Geneva movement. The driving member 27 of the Geneva movement is secured to the same shaft as a bevel gear 28, the latter being driven by a corresponding bevel gear 29 mounted on a shaft 30.

The shaft 30 is driven by a power source through a positive drive clutch 31, whose construction and operation are described below. The referred-to power source supplies power to other operating portions of the overall machinery and is not described in detail herein since it may be of any suitable form and does not constitute a feature of the invention.

It will be apparent in view of the above that the Geneva movement 26—27 provides intermittent rotation of the drum 21, each movement encompassing 90°. It will also be seen, in Fig. 3, that since the packages 11 are taller than they are wide, as arranged in the supply file, the ends of the packages, after rotation through 90°, will protrude beyond the sides of the packages which remain in the supply file. Conversely, the ends of the packages which have not been rotated will protrude above and below those packages which have been rotated.

The downward (and/or upward) protrusion of the ends of the nonrotated packages beyond the lower (and/or upper) sides of the rotated packages may be employed to advantage in stopping the forward movement of the nonrotated packages while permitting forward movement of rotated packages. More specifically, the stop members 22 may be fixed members, as shown, each extending across the path of the packages. The lower stop member extends to such a height that it may engage the lower protruding end of a nonrotated package while being too low to engage the lower edges of rotated packages, and the upper stop member extends downwardly to such a level that it may engage the upper protruding end of a nonrotated package while being sufficiently high that it permits passage thereunder of rotated packages.

The protrusion of the ends of the rotated packages beyond the sides of the nonrotated packages may be employed to advantage in engaging the rotated packages to draw them away from the nonrotated packages. For this purpose there is provided a pair of fingers 32 pivotally mounted on pins 32a. The pins 32a are mounted by arms 33 on a carriage 34. The latter is movable along rails 35 on rollers 36 which engage the upper, lower and inner surfaces of these rails.

The entire carriage is intermittently moved back and forth along the rails 35 by arms 37 and 38 which are in turn driven through a cam 39, preferably from the same power source as that which drives the drum 21.

Referring again to Fig. 1, it will be seen that the fingers 32 are urged inwardly by springs 40 which are connected at their forward ends to the arms 33 and at their rearward ends to brackets 41 which are secured to the fingers 32.

After a group of packages of predetermined number is moved forward (six in the specific embodiment illustrated), the rotated packages are in position to clear the stop members 22, whereupon the pressure of the succeeding packages in contact with the conveyor belts 12 and 13 forces the rotated packages forwardly past the stop members 22 and onto a pair of rails 42. A pair of guide rails 43 are provided to maintain the rotated packages on the rails 42. The forward movement of the rotated packages and of the supply file of nonrotated packages is again interrupted when the forwardmost nonrotated package strikes the stop members 22. At the same time, prior to the rotation of the next group of six packages, the carriage 34 may move to its rearwardmost position, illustrated in solid lines in Figs. 1 and 2. During this rearwardmost movement of the carriage the fingers 32 are thrust outwardly as they ride to the rear over the ends of the rotated packages. When the carriage 34 reaches its rearwardmost position the fingers 32 are located to the rear of the rearwardmost rotated package, whereupon they may snap inwardly and engage the rearward corners or edges of the rearwardmost rotated package as illustrated in Fig. 1. Subsequent forward movement of the carriage 34 draws the six rotated packages forwardly, away from the supply file, whereby the rotated group of packages may be handled as an individual group entirely separate of the supply file.

The entire operation may be repeated when the next group of six packages is rotated by the drum 21 to a position wherein the packages may pass by the stop members 22. Succeeding packages in the supply file then force the rotated packages forwardly to a position wherein they in turn may be engaged by the fingers 32 and drawn ahead of the supply file.

It has already been pointed out that the cam 39, the arms 37 and 38, and hence the carriage 34 are driven by the same power source as that which drives the drum 21. This arrangement is preferred in order to assure synchronous, in-phase operation of these two elements of the machine. Preferably, however, the operation of both of these elements is controlled by a trigger which is responsive to the arrival of the desired number of packages in the cylinder or drum 21. Such a control feature assures that the drum will not be caused to rotate with less than the desired number of packages contained therein, which condition might readily arise if the packages on the conveyor belts 12 and 13 happened to be scattered and if the drum 21 were to rotate in a regular time sequence.

For this purpose a trigger 45 is provided near the exit of the drum 21, the trigger being secured to a shaft 46 which is rotatably mounted in suitable bearings. Also secured to the shaft 46 is an arm 47 which normally engages the driven element of the clutch 31 to prevent rotation of the driven clutch member and hence to prevent operation of the Geneva movement 26—27 and of the carriage 34. The trigger 45 normally is positioned to the left of the lower stop member 22, but can be moved forwardly through a suitable opening in the lower stop member 22 by the thrust of packages thereagainst. When the trigger 45 is forced ahead by the pressure of packages in the drum 21, the arm 47 permits engagement of the clutch 31. This clutch is preferably of a well known class which drivingly engages only when the driving and driven clutch elements are in a certain phase relationship. This assures "in phase" as well as synchronous operation of the various parts of the entire machine.

This control apparatus assures the presence in the drum 11 of the desired number of packages during each rotation of the drum since a package can operate the trigger 45 only if a close file of packages is present to drive the forwardmost package forwardly into trigger-operating position.

The apparatus so far described permits the separation of groups of packages of predetermined number from a supply file by advancing such packages longitudinally of the supply file and away from the remainder of the supply file. The essence of the method and apparatus employed in accomplishing this result is that each successive group of packages is rotated such that certain portions of the rotated packages protrude beyond the edges of the remaining packages in the supply file. As previously indicated, if square packages are employed, that is, packages having a square forward face, the same operation may be effected by rotating the packages through an angle of less than 90°, preferably 45°, whereby the corners of the rotated packages extend beyond the edges of the remaining packages in the supply file. This can be accomplished by any one of various conventional means including a Geneva movement designed to provide intermittent movement through 45° angles rather than the more common 90° angle.

The method and apparatus so far described lend themselves readily to a further method of handling packages now to be described. By this further method a large number of packages may be arranged in successive individual groups each having precisely the desired number of packages included therein in spite of the fact that a given length of the supply file is removed in each group-forming operation and in spite of the fact that the packages may vary substantially in their thickness.

Figure 4:
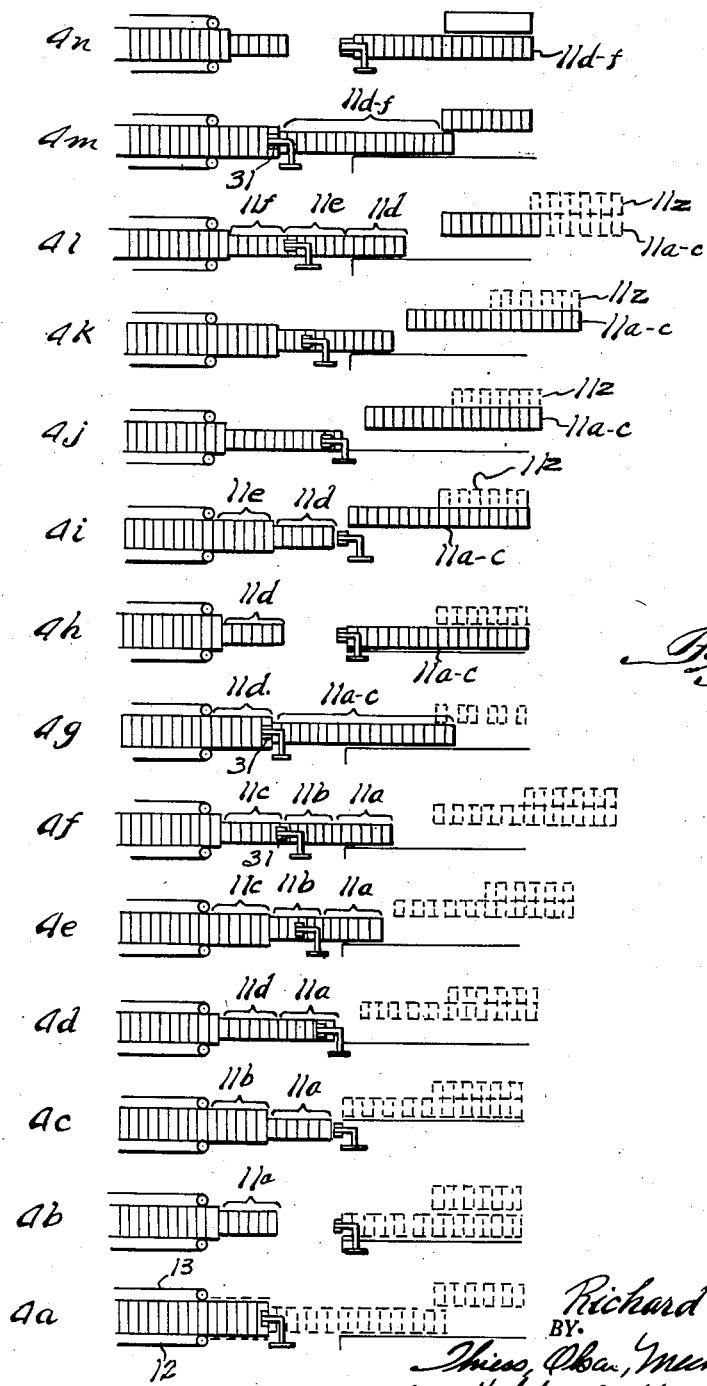
Figs. 4a to 4n are diagrams illustrating successive steps in the handling of packages in accordance with one embodiment of the invention.

In the specific embodiment of the invention illustrated in Figs. 4a–4n, it is desired that eighteen packages be separated from the file and arranged as a single row or file. Obviously, if an attempt is made to remove eighteen packages from a supply file by removing or separating a predetermined length of that supply file, and if the packages vary substantially in thickness, a group of packages which contains more or less than eighteen packages may result. In accordance with the present invention, a group of eighteen packages is removed in three successive operations, six packages being removed from the supply file in each operation. It will be apparent that if only six packages are removed at each operation, the packages may vary substantially in thickness without affecting the number of packages removed. For example, if the packages average 2 inches in thickness, the separating means (the rotating drum 21 in the preferred embodiment of the invention), can be made to operate on approximately 11 inches of the length of the supply file. Accordingly, exactly six packages will in each case be separated from the remainder of the supply file even though the average thickness of six packages may vary from the normal 2 inches by as much as 5% to 10%.

If, on the other hand, the separating apparatus for forming individual groups were made to operate on some 35 inches of the supply file and the eighteen packages intended to be separated by such an operation varied by as much as 5%, seventeen or nineteen packages could easily be separated from the file rather than the desired eighteen.

This novel method is shown in operation in Figs. 4a–4n. In Fig. 4a the conveyor belts 12 and 13 may be seen feeding packages to the right into an area in which six packages are to be separated from the remainder of the supply file. In Fig. 4b it may be seen that a group of packages 11a has been rotated as by the drum 21, whereby they are distinguishable from the remainder of the supply file. It will be understood, of course, that six packages 4a may also be raised or lowered or removed transversely with respect to the remainder of the supply file to separate them from the supply file.

In Fig. 4c it will be seen that the packages 11a have been advanced to the right by succeeding packages 11b. In Fig. 4d the packages 11b are shown rotated through 90° whereby they, too, are distinguished from the remainder of the supply file.

In Fig. 4e, the groups of rotated packages 11a and 11b have been thrust forward by the succeeding packages 11c, and in Fig. 4f the packages 11c have also been rotated through 90°.

In Fig. 4g the eighteen packages constituting the group 11a–c have been advanced to the right by succeeding packages 11d. At this time in the sequence of operation the fingers 31 have reached their rearwardmost position and have engaged the rearwardmost package of the group of eighteen packages. It should be noted that where smaller groups of packages are desired, for example groups containing six packages, each successive group of six packages may be engaged by the fingers 31 and advanced longitudinally away from the supply file. However, in the embodiment of the invention now being described it is desired that eighteen packages be included in each successive group. Accordingly, the fingers 31 may be made to operate only once during each three operations of the drum 21. More broadly, the apparatus which ultimately handles the desired group of eighteen packages may be made to operate only once for each three operations of the apparatus which distinguishes or separates a group of six packages from the supply file.

In Fig. 4h it will be seen that the group of packages 11a–c has been advanced to the right, away from the remainder of the supply file, and that the group of packages 11d has been rotated. In Fig. 4i the groups of packages 11a–c has been elevated and the packages 11d have been advanced by succeeding packages 11e. As the packages 11a–c rise they lift above them nine packages 11z which are the residue of a preceding group of eighteen packages.

In Figs. 4j, 4k and 4l, the packages 11a–c have been moved successively to the right by apparatus not disclosed in the drawings, while the group of packages 11d has been advanced to the right and groups 11e and 11f have been rotated to complete the next group of eighteen packages.

In Fig. 4m the packages 11z and half of the packages of the group 11a–c have been removed by insertion into a case adapted to receive nine rows and two tiers of packages. In the same figure, the fingers 31 have reached their rearwardmost position and have engaged the rearwardmost packages of the group 11d–f. In Fig. 4n the group 11d–f has been moved under the remaining half of the group 11a–c, this illustrating the same condition as in Fig. 4h after one complete cycle of operation.

It will now be seen that Figs. 4a–4n disclose a method by which a large predetermined number of packages may be distinguished and withdrawn from a supply file by apparatus which measures off a given length of the supply file, the method assuring that said predetermined number of packages will be so distinguished and so withdrawn from the supply file in spite of substantial variation of the thickness of the packages. The referred-to method includes the steps of successively distinguishing a given number of packages from the remainder of the supply file, said number being integrally divisible into said predetermined number of packages desired to be removed ultimately as a group from the supply file.

It will be apparent that the invention may be varied in its physical embodiment without departing from the spirit of the invention, and it is desired, therefore, that the invention be limited only by the prior art and the scope of the appended claims.

Moreover, the recital of the foregoing objects or statements of invention is not intended to limit the inventive disclosure of the drawings. The latter drawings are to be taken as the most fully informatory source of what applicant's invention comprises. Accordingly, any and all novel features and/or combinations of features which are disclosed herein (the word "disclosed" being used as distinguished from "stated" or "claimed")—either in the drawings and/or in the specification and/or in the claim or claims (may be in any one of the three sections of the application to the exclusion of the other two)—whether or not specified as new and/or comprising part of the invention and which were unknown before applicant entered the field, are applicant's invention.

In short, everything in the drawings is new unless it shall be found to have been known heretofore. Moreover, irrespective of whether or not all of the elements, or combinations thereof, shown in the drawings or described in the specification or claimed in the claims are asserted to be new, it is intended that the mere disclosure of these elements, and/or any combinations thereof, constitutes a claim of invention to every element and combination not known before applicant's contribution.

Therefore, any and all combinations disclosed in any one or more of the three parts of this application may be claimed originally or at any future time. The necessity of claiming at some future time what is not now specifically designated as applicant's invention may arise because others may claim what applicant has here disclosed but in language not now anticipated as definitory by applicant. Accordingly, future drafted claims may be required properly to protect applicant because he cannot now anticipate the variations of language which others may deem descriptive of some element or combination of elements shown in applicant's drawings.

The invention having thus been desribed, what is claimed and desired to be secured by Letters Patent is:

1. In apparatus for separating successive groups of packages of predetermined number from an advancing supply file, means for rotating said predetermined number of packages forwardmost in said supply file about an axis parallel to said supply file, means for engaging a portion of the rearwardmost one of the packages so rotated which protrudes beyond the edges of the nonrotated packages in said supply file, and means for advancing said engaging means and said rotated packages forwardly of the nonrotated packages in said supply file.

2. In apparatus for separating successive groups of packages of predetermined number from an advancing supply file, means for rotating said predetermined number of packages forwardmost in said supply file about an axis parallel to said supply file, means for engaging a portion of the rearwardmost one of the packages so rotated which protrudes beyond the edges of the nonrotated packages in said supply file, means for advancing said engaging means and said rotated packages forwardly of the nonrotated packages in said supply file, and means for stopping the forwardmost nonrotated packages in said supply file at a rotating station comprising a member so located that it may engage a portion of the forwardmost nonrotated package which protrudes beyond the edges of the rotated packages.

3. In apparatus for separating successive groups of packages of predetermined number from an advancing supply file, said packages having rectangular faces extending perpendicular to the direction of advancement of said supply file, means for rotating said predetermined number of packages forwardmost in said supply file through an angle of 90° about an axis parallel to said supply file, means for engaging an end of the rearwardmost one of the packages so rotated which protrudes beyond the sides of the nonrotated packages in said supply file, and means for advancing said engaging means and said rotated packages forwardly of the nonrotated packages in said supply file.

4. In apparatus for separating successive groups of packages of predetermined number from an advancing supply file, said packages having rectangular faces extending perpendicular to the direction of advancement of said supply file, means for rotating said predetermined number of packages forwardmost in said supply file through an angle of 90° about an axis parallel to said supply file, means for engaging an end of the rearwardmost one of the packages so rotated which protrudes beyond the sides of the nonrotated packages in said supply file, means for advancing said engaging means and said rotated packages forwardly of the nonrotated packages in said supply file, and means for stopping the forwardmost nonrotated packages in said supply file at a rotating station comprising a member so located that it may engage an end of the forwardmost nonrotated package which protrudes beyond the sides of said rotated packages.

5. In apparatus for separating successive groups of packages of predetermined number from an advancing supply file, means for distinguishing said predetermined number of packages from others in said supply file comprising, containing means for receiving a group of packages of said predetermined number as said group advances in said supply file, and means for rotating said containing means whereby said group is distinguished from the remainder of said supply file by protrusion of at least one portion of said packages in said group beyond the edges of said packages remaining in said supply file.

6. In apparatus for separating successive groups of packages of predetermined number from an advancing supply file, said packages having rectangular faces extending perpendicular to the direction of advancement of said supply file, means for distinguishing said predetermined number of packages from others in said supply file comprising, containing means for receiving a group of packages of said predetermined number as said group advances in said supply file, and means for rotating said containing means through an angle of 90° whereby said group is distinguished from the remainder of said supply file by protrusion of at least one end portion of said packages in said group beyond the sides of said packages remaining in said supply file.

7. The method of successively separating groups of packages of predetermined number from an advancing supply file which comprises, rotating said predetermined number of packages forwardmost in said supply file about an axis parallel to said supply file, engaging a portion of the rearwardmost one of the packages so rotated which protrudes beyond the edges of the nonrotated packages in said supply file, and advancing said rotated packages forwardly of the nonrotated packages in said supply file.

8. The method of successively separating groups of packages of predetermined number from an advancing supply file which comprises, rotating said predetermined number of packages forwardmost in said supply file about an axis parallel to said supply file, engaging a portion of the rearwardmost one of the packages so rotated which protrudes beyond the edges of the nonrotated packages in said supply file, advancing said rotated packages forwardly of the nonrotated packages in said supply file, and stopping and retaining the forwardmost nonrotated packages in said supply file at a rotating station by engaging a portion of the forwardmost nonrotated package which protrudes beyond the edges of preceding rotated packages.

9. The method of successively separating groups of packages of predetermined number from an advancing supply file, said packages having rectangular faces extending perpendicular to the direction of advancement of said supply file, said method comprising rotating said predetermined number of packages forwardmost in said supply file through an angle of 90° about an axis parallel to said supply file, engaging an end portion of the rearwardmost one of the packages so rotated which protrudes beyond the sides of the nonrotated packages in said supply file, and advancing said rotated packages forwardly of the nonrotated packages in said supply file.

10. The method of successively separating groups of packages of predetermined number from an advancing supply file, said packages having rectangular faces extending perpendicular to the direction of advancement of said supply file, said method comprising rotating said predetermined number of packages forwardmost in said supply file through an angle of 90° about an axis parallel to said supply file, engaging an end portion of the rearwardmost one of the packages so rotated which protrudes beyond the sides of the nonrotated packages in said supply file, advancing said rotated packages forwardly of the nonrotated packages in said supply file, and stopping and retaining the forwardmost nonrotated packages in said supply file at a rotating station by engaging an end portion of the forwardmost nonrotated package which protrudes beyond the sides of preceding rotated packages.

11. In a method of successively separating groups of packages of predetermined number from an advancing supply file, the steps comprising distinguishing said predetermined number of packages from others in said supply file by rotating said predetermined number of packages about an axis parallel to said supply file whereby at least one portion of each of said rotated packages protrudes beyond the edges of the remaining nonrotated packages in the supply file, stopping the forward movement of the unrotated packages and advancing the rotated packages in said supply file.

12. In a method of successively separating groups of packages of predetermined number from an advancing supply file, said packages having rectangular faces extending perpendicular to the direction of advancement of said supply file, the steps comprising distinguishing said predetermined number of packages from others in said supply file by rotating said predetermined number of packages through an angle of 90° about an axis parallel to said supply file whereby at least one end portion of each of said rotated packages protrudes beyond the sides of the remaining nonrotated packages in the supply file, stopping the forward movement of the unrotated packages and advancing the rotated packages in said supply file.

13. The method of successively separating groups of packages of predetermined number from an advancing supply file which comprises, rotating a predetermined length of the forwardmost end of said supply file about an axis parallel to said supply file, said length of said supply file being sufficiently short that it necessarily contains a definite number of packages, said number being integrally divisible into said predetermined number, alternately advancing said supply file including the packages so rotated and rotating successive groups of packages of said definite number until said predetermined number of packages have been rotated, engaging a portion of the rearwardmost one of the packages so rotated which protrudes beyond the edges of the nonrotated packages in said supply file, and advancing said rotated packages forwardly of the nonrotated packages in said supply file.

14. The method of removing a predetermined number of the forwardmost packages of an advancing supply file which comprises, successively distinguishing a predetermined length of the forwardmost end of said supply file by rotating the packages in said length of supply file, said length of said supply file being sufficiently short that it necessarily contains a definite number of packages, said number being integrally divisible into said predetermined number, and successively combining the rotated packages to form a file distinguished from the remainder of said supply file until said predetermined number of packages is arranged in said distinguished file.

15. The method of removing a predetermined number of the forwardmost packages of an advancing supply file which comprises, successively distinguishing a predetermined length of the forwardmost end of said supply file by rotating the packages in said length of supply file, said length of said supply file being sufficiently short that it necessarily contains a definite number of packages, said number being integrally divisible into said predetermined number, successively removing said thus distinguished packages from said supply file, and successively combining the removed packages to form a file separate from the remainder of said supply file until said predetermined number of packages is arranged in said separate file.

References Cited in the file of this patent

UNITED STATES PATENTS

| | | |
|---|---|---|
| 1,907,189 | Seaman | May 2, 1933 |
| 1,967,719 | Morgan | July 24, 1934 |
| 2,612,815 | Britt | Oct. 7, 1952 |